Aug. 18, 1964 J. A. SHUPING 3,145,248
OPTICAL SIGHT DISPLACING GLASS
Filed Dec. 14, 1960
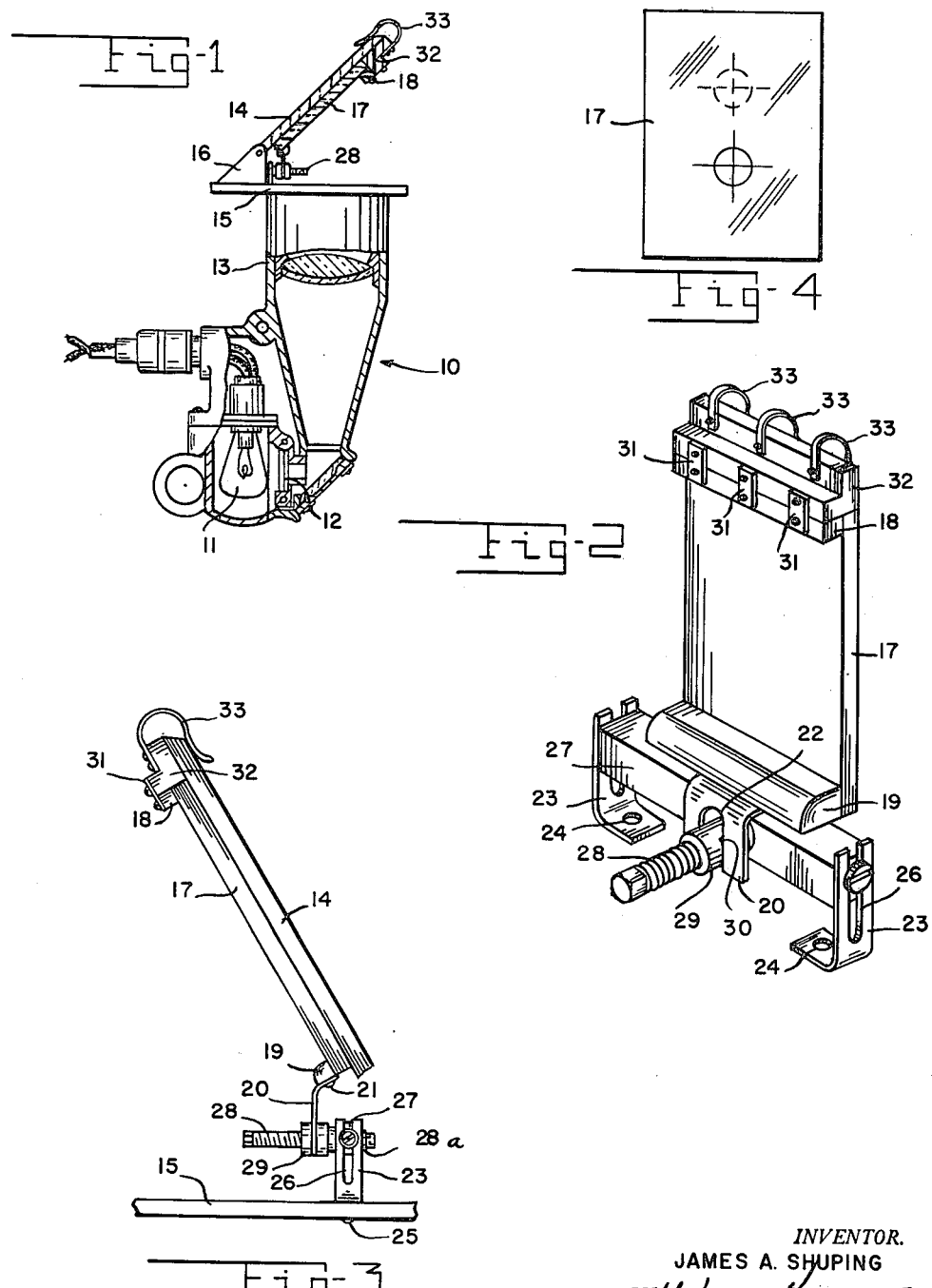
INVENTOR.
JAMES A. SHUPING
BY [signature]
ATTORNEY
[signature]
AGENT

United States Patent Office 3,145,248
Patented Aug. 18, 1964

3,145,248
OPTICAL SIGHT DISPLACING GLASS
James A. Shuping, Albuquerque, N. Mex., assignor to the United States of America as represented by the Secretary of the Air Force
Filed Dec. 14, 1960, Ser. No. 75,890
1 Claim. (Cl. 88—1)
(Granted under Title 35, U.S. Code (1952), sec. 266)

The invention described herein may be manufactured and used by or for the United States Government for governmental purposes without payment to me of any royalty thereon.

This invention relates in general to aircraft sights and, more particularly, to a displacing glass attachment for reflex type optical gun sights to provide such sights with a low altitude bombing capability.

Modern aircraft are usually equipped with what is known as a reflex gun sight. The elements of such sights generally include an illuminating source, a reticle, a collimating lens system and a reflex mirror or glass. Additional optical elements such as folding mirrors may be included; however, the above-mentioned are the fundamental necessities.

In operation, light from the illuminating source passes through the reticle to the collimating lens. From the lens, the light strikes the reflex mirror or glass which is usually disposed at an angle approximately 45° to the direction of the light emerging from the lens. The reflex mirror, which is generally a parallel plate glass, reflects part of the light to an observer. The remainder of the light is transmitted through the glass. Thus, an observer sees an image of the reticle at infinity in a direction substantially perpendicular to the direction of the light emerging from the lens system.

The direction at which the reticle appears can be determined by setting the sight at some fixed position. Generally speaking, this direction is parallel to the axis of the forward firing weapons of the aircraft. Therefore, a pilot flying an aircraft aligns the reticle pattern with the target at which he is aiming and fires his weapons. Theoretically, the path which the projectiles of the forward firing weapons will follow will lead the projectiles to the target.

If, however, the pilot of the aircraft wishes to use his gun sight for low altitude bombing, provision must be made to depress the reticle image some predetermined amount depending upon the altitude of the aircraft. This depression is necessary to compensate for the fail of gravtiy. A bomb released from a low flying aircraft will not follow a straight line but will because of the effect of gravity assume a trajectory.

To adapt these gun sights for low altitude bombing, therefore, provisions have been made so that the angle of the reflex glass may be varied. By varying the angle of the reflex glass, the reticle image may be depressed the predetermined amount necessary to compensate for the effect of gravity. Therefore, when the observer in the aircraft brings the depressed reticle pattern upon the target, bombs released will theoretically strike that target.

Various attempts have been made in the past to adapt reflex gun sights for low altitude bomb delivery. As above mentioned, the reflector glass itself can be made adjustable. Before leaving on a mission, the gun sight reflector glass may be adjusted so that the aircraft is capable of low altitude bombing. This procedure, however, presents difficulties for if the pilot finds occasion to use the forward firing weapons of the aircraft, the reticle pattern will not be aligned for this purpose.

To alleviate this difficulty, provisions have been made so that the pilot of the aircraft may make reflex glass adjustments while in flight. Such an arrangement, however, has its disadvantages. Such a gun sight must be, by its very nature, bulkier and more complex. In modern aircraft where space and weight are at a premium, it is most desirable to provide a simple and efficient gun sight for the mission which the aircraft is intended to accomplish.

Other disadvantages of the aforementioned arrangement are also apparent. For example, if a pilot is using his aircraft for low altitude bomb delivery and he should find an immediate need for forward firing of the aircraft weapons, he must fumble with the adjustments to set the gun sight back to forward firing position. In these situations, time is at a premium and, therefore, the quickest method by which he may adapt his gun sight to forward firing position is obviously the most desirable. Any method which takes too much time may be fatal.

Other problems are also encountered with modern-day aircraft. For example, certain aircraft are intended to be used as a defensive weapon only. In this situation, the aircraft is provided with a fixed gun sight, which is aligned with the aircraft's forward firing weapons. In an emergency situation, however, it may be desirable to provide such an aircraft with a limited low altitude bombing capability.

It is, therefore, the general object of the present invention to provide aircraft with fixed optical sights, with a low altitude bombing capability.

It is a further object of the present invention to provide an aircraft which has a fixed optical sight with a reflector glass attachment which adapts the fixed gun sight for low altitude bomb delivery.

Finally, it is an object of the present invention to provide an aircraft having a fixed optical sight with an attachment to adapt the fixed gun sight for low altitude bomb delivery, which attachment is not bulky or weighty and is inexpensive to manufacture and which is easy to install.

These and other objects and advantages, apparent to those skilled in the art, may be obtained from the following description and claim. A preferred embodiment of the present invention is set forth in the following description and shown in the drawings and is particularly and distinctly pointed out and set forth in the appended claim forming a part hereof.

The nature of the optical sight displacing glass attachment of the present invention may be stated in general terms as including an illuminating source, a reticle, a collimating lens system, a fixed reflex glass, a second reflex glass detachably mounted on the fixed reflex glass, the angle between the plane of the second reflex glass and the axis of the lens system being adjustable.

By way of example, the preferred embodiment of the present invention is shown in the accompanying drawing, wherein:

FIG. 1 illustrates the gun sight of the present invention with the second optical reflex glass attached to the fixed optical glass of a standard gun sight;

FIG. 2 is a perspective view showing the attachment of the present invention, together with the hardware for mounting the attachment on the standard gun sight glass;

FIG. 3 is a side view of the displacing glass of the present invention showing the method by which it is attached to the fixed reflex glass of a standard gun sight; and FIG. 4 is a diagrammatic view showing the relative positions of the reticle images as an observer would see them when using the displacing glass attachment of the present invention.

Similar numerals refer to similar parts throughout the various figures of the drawing.

Referring now to the drawing, a standard reflex-type gun sight is indicated at 10 and includes an illuminating source 11, a reticle 12, a collimating lens 13 and a fixed reflex glass 14. The fixed glass 14 may, for example, be mounted upon the head 15 of the gun sight 10 by a pair of upwardly extending triangular-shaped flanges 16.

According to the present invention, a second reflex glass 17 is provided to be detachably mounted to the fixed reflex glass 14 of the standard gun sight 10. Referring in particular to FIG. 2, the reflex glass 17 has attached to its upper end a top frame member 18 and at its lower end, a bottom frame member 19. Top frame member 18 and bottom frame member 19 are preferably attached to reflex glass 17 by a suitable glue or cement.

A generally L-shaped spring follower 20 is mounted on bottom frame member 19 at approximately the center thereof by rivet 21. One leg of spring follower 20 has a slot 22 formed therein for the purpose to be described below.

The reflex glass attachment of the present invention also includes a pair of L-shaped mounting brackets 23. One leg of mounting bracket 23 may be provided with a hole 24 to attach the mounting bracket to the head 15 of the gun sight 10. As for example, in FIG. 3, the mounting bracket 23 is indicated as being attached to the head 15 by a suitable rivet 25.

The second leg of mounting bracket 23 has formed therein a slot 26. A cross arm 27 extending between mounting brackets 23 and at each thereof a screw is provided so that the cross arm may slide and rotate in slot 26.

Adjustment screw 28 is mounted in cross arm 27 and is rotatable about its axis. However, the longitudinal movement of screw 28 is restricted by shoulder 28a. The outer end is shaped similar to a hexagonal nut so that it may be conveniently rotated by a suitable wrench. A slot (not shown) may also be provided in the outer end of screw 28 so that a screw driver may be used for rotating the screw.

Threadably mounted on adjustment screw 28 is a follower nut 29. Follower nut 29 is generally cylindrical in configuration, however, two grooves 30 are formed opposite one another perpendicular to the axis of the nut. Spring follower 20 and the follower nut 29 engage one another. The two legs of spring follower 20 formed by slot 22 fit in grooves 30 as best seen in FIG. 2.

As above mentioned, a top frame member 18 is mounted on the upper end of reflex glass 17. A plurality of spring hinges 31 are mounted on and spaced at intervals across top frame member 18. The other end of spring hinges 31 is attached to a clip mount 32 as seen in FIG. 2.

Also attached to clip mount 32 are a plurality of spring clips 33. Spring clips 33 are generally U-shaped, however, one leg thereof is out turned slightly so that the reflex glass attachment of the present invention may be easily clipped to the reflex glass 14 of a standard reflex type gun sight, as shown in FIG. 3.

The contemplated use of the reflex glass attachment of the present invention is generally as follows. Mounting bracket legs 23 are preferably permanently installed on the head 15 of the standard reflex gun sight already installed in an aircraft. Mounting bracket legs 23 may also be installed by temporary means such as by screws which may be removed each time the gun sight attachment is removed. The cross arm is then inserted in the slot 26 of the mounting bracket legs 23. The reflex glass 17 with hardware attached is then clipped onto the standard reflex gun sight glass 14.

At the same time, the two legs in spring follower 20 are inserted in the grooves 30 of follower nut 29. The reflex glass of the attachment may then be adjusted by rotating adjustment screw 28. When screw 28 is turned in one direction, follower nut 29 will move along the screw in a particular manner according to the threads of the screw and nut. When adjusted for low altitude bombing, the angle of reflex glass 17 will be slightly different than that of reflex glass 14. Since the two reflex glasses 14 and 17 are at different angles with respect to the light emerging from the collimating lens system, two reticle patterns will be reflected, one each by the two reflex glasses.

FIG. 4 illustrates diagrammatically the two reticle patterns as an observer might see them in the reflex glass attachment of the present invention as installed on a standard reflex gun sight. The upper reticle pattern shown in dotted lines would be that reticle pattern reflected by reflex glass 14. The lower reticle pattern shown in FIG. 4 in full lines is that which would be reflected by reflex glass 17.

If the pilot of the aircraft were to use the forward firing weapons, he would bring the upper reticle pattern upon the target. If he were to use the plane for low altitude bombing, he would release the bombs when the lower reticle was aligned with the target. Therefore, with the attachment installed, the aircraft may be used for forward firing or low altitude bombing without making in flight changes or adjustments. The gun sight and the attachment are merely set before the plane leaves on the mission and nothing need be done thereafter.

When reflex glass 17 is adjusted at an angle slightly different from that of reflex glass 14, clip mount 32 remains flush against reflex glass 14. Hinges 31 will permit the lower end of reflex glass 17 to be moved a slight direction outward from reflex glass 14, while the upper end stays flush.

Accordingly, the reflex glass attachment of the present invention permits a standard reflex type gun sight, which has a fixed reflex glass, to be used to provide an aircraft with a low altitude bombing capability.

In the foregoing description certain terms have been used for brevity, clearness and understanding, but no unnecessary limitations are to be implied therefrom beyond the requirements of the prior art, because such terms are used for descriptive purposes herein and not for the purpose of limitation and are intended to be broadly construed.

Moreover, embodiments of the improved construction illustrated and described are by way of example and the scope of the present invention is not limited to the exact details of the construction of the various parts.

Having now described the features and operation of the invention, the example of the preferred embodiment thereof, the advantageous new and useful results obtained thereby, the new and useful improvements, constructions and elements obvious to those skilled in the art are set forth in the appended claim.

I claim:

In an optical reflex type gun sight including, an illuminating source, a reticle, a collimating lens system, and a fixed reflex glass cooperating in a well known manner to present a first reticle image on the glass, the improvement comprising an attachment for said sight, said attachment comprising: an adjustable reflex glass, a top frame member mounted at one end of the adjustable glass, spring hinge means, a spring clip mount having a plurality of spring clips which engage said fixed reflex glass to secure said clip mount to said fixed reflex glass, one end of the spring hinge means mounted on the top frame member, the other end of the spring hinge means mounted on the spring clip mount; a bottom frame member, a spring follower mounted on the bottom frame member; a pair of mounting brackets secured to said gun sight, each bracket having a slot formed in one leg thereof, a cross arm extending between the mounting brackets being slidable and rotatable in the slots, an adjustment screw mounted on the cross arm, a cylindrically shaped follower nut threadably mounted on the adjustment screw, the follower nut having two grooves formed perpendicular to the nut axis, the spring follower having a slot formed in one portion thereof adapted to engage and slide in said follower nut grooves whereby the attachment is removably mounted on the fixed reflex glass of said gun sight so that the angle between the plane of the adjustable reflex glass and light emerging from the gun sight may be adjusted to present second reticle image on the glass which can be adjusted relative to the first reticle image by manipulation of the adjustment screw.

References Cited in the file of this patent

UNITED STATES PATENTS

| | | |
|---|---|---|
| 1,600,461 | Ensign | Sept. 21, 1926 |
| 1,994,648 | Hoile | Mar. 19, 1935 |
| 2,118,964 | Barron | May 31, 1938 |
| 2,354,720 | Wagner | Aug. 1, 1944 |
| 2,453,697 | Brown | Nov. 16, 1948 |
| 2,473,524 | Hibbard et al. | June 21, 1949 |
| 2,486,225 | Townsley | Oct. 25, 1949 |
| 2,782,686 | Rothgart et al. | Feb. 26, 1957 |
| 2,949,808 | Thurow | Aug. 23, 1960 |